(12) United States Patent
Mulder et al.

(10) Patent No.: US 11,400,631 B2
(45) Date of Patent: Aug. 2, 2022

(54) EXTRUDER SYSTEM AND METHOD FOR EXTRUDING CORD-REINFORCED TIRE COMPONENTS

(71) Applicant: VMI HOLLAND B.V., Epe (NL)

(72) Inventors: Gerben Mulder, Epe (NL); Simon Benedikt Wachter, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 16/500,606

(22) PCT Filed: Mar. 28, 2018

(86) PCT No.: PCT/EP2018/057991
§ 371 (c)(1),
(2) Date: Oct. 3, 2019

(87) PCT Pub. No.: WO2018/184955
PCT Pub. Date: Oct. 11, 2018

(65) Prior Publication Data
US 2020/0189165 A1 Jun. 18, 2020

(30) Foreign Application Priority Data

Apr. 3, 2017 (NL) .................................. 2018638
Dec. 27, 2017 (NL) .................................. 2020186

(51) Int. Cl.
*B29C 48/34* (2019.01)
*B29C 48/285* (2019.01)
(Continued)

(52) U.S. Cl.
CPC .............. *B29C 48/34* (2019.02); *B29C 48/07* (2019.02); *B29C 48/2566* (2019.02);
(Continued)

(58) Field of Classification Search
CPC . B29C 48/34; B29C 48/2566; B29C 48/2883; B29C 48/07; B29C 48/25686;
(Continued)

(56) References Cited

U.S. PATENT DOCUMENTS 3,517,097 A * 6/1970 Mixell .................... B29C 33/04
264/177.18
4,300,878 A * 11/1981 Ible ....................... B29C 48/305
425/114
(Continued)

FOREIGN PATENT DOCUMENTS

CN 101166617 A 4/2008
CN 103213264 A 7/2013
(Continued)

OTHER PUBLICATIONS

International Search Report and Written Opinion from PCT Application No. PCT/EP2018/057991, dated May 23, 2018.
(Continued)

*Primary Examiner* — Jeffrey M Wollschlager
*Assistant Examiner* — Shibin Liang
(74) *Attorney, Agent, or Firm* — Workman Nydegger

(57) ABSTRACT

The invention relates to an extruder system and a method for extruding cord reinforced extrudate, in particular for tire components, wherein the extruder system comprises an extruder head with flow channels for receiving an extrusion material from an extruder, a die for receiving said extrusion material from the flow channels and a cord guide for guiding cords side-by-side in a cord plane into the die, wherein the extruder head is provided with an insertion slot that extends in an insertion direction parallel to the cord plane through the extruder head, wherein the flow channels debouch into the insertion slot at a flow area, wherein the insertion slot is arranged for receiving the die and the cord guide in the (Continued)

insertion direction into a die position downstream of the flow area and a cord guide position upstream of the flow area, respectively, with respect to the insertion direction.

40 Claims, 11 Drawing Sheets

(51) Int. Cl.
| | |
|---|---|
| *B29C 48/265* | (2019.01) |
| *B29C 48/07* | (2019.01) |
| *B29C 48/25* | (2019.01) |
| *B29C 48/21* | (2019.01) |
| *B29D 30/08* | (2006.01) |
| *B29D 30/38* | (2006.01) |
| *B29C 48/156* | (2019.01) |
| *B29C 48/305* | (2019.01) |

(52) U.S. Cl.
CPC ...... *B29C 48/25686* (2019.02); *B29C 48/265* (2019.02); *B29C 48/2883* (2019.02); *B29C 48/156* (2019.02); *B29C 48/21* (2019.02); *B29C 48/254* (2019.02); *B29C 48/2886* (2019.02); *B29C 48/298* (2019.02); *B29C 48/307* (2019.02); *B29D 2030/084* (2013.01); *B29D 2030/381* (2013.01)

(58) Field of Classification Search
CPC . B29C 48/265; B29C 48/2886; B29C 48/156; B29C 48/254; B29C 48/21; B29C 48/307; B29C 48/298; B29C 47/128; B29C 47/12; B29D 2030/084; B29D 2030/381
See application file for complete search history.

(56) References Cited

U.S. PATENT DOCUMENTS

| | | | |
|---|---|---|---|
| 4,588,538 A * | 5/1986 | Chung | B29B 15/122 |
| | | | 264/29.2 |
| 5,162,120 A | 11/1992 | Baxter et al. | |
| 5,259,746 A | 11/1993 | Minuado | |
| 5,804,222 A | 9/1998 | Brown et al. | |
| 8,585,949 B2 | 11/2013 | Ponta et al. | |
| 9,120,262 B2 | 9/2015 | Ponta et al. | |
| 10,807,294 B2 | 10/2020 | De Bruijn et al. | |
| 2005/0193494 A1 | 9/2005 | Lau | |
| 2006/0113026 A1 | 6/2006 | Suda | |
| 2008/0038392 A1* | 2/2008 | Druet | B29C 48/325 |
| | | | 425/113 |
| 2009/0174103 A1 | 7/2009 | Ponta et al. | |
| 2014/0042663 A1 | 2/2014 | Ponta et al. | |
| 2015/0231843 A9 | 8/2015 | Ponta et al. | |
| 2016/0059466 A1 | 3/2016 | Dyrlund et al. | |
| 2016/0176096 A1* | 6/2016 | Dyrlund | B29C 48/07 |
| | | | 425/192 R |
| 2016/0325478 A1* | 11/2016 | Janszen | B29D 30/38 |
| 2018/0093406 A1 | 4/2018 | De Bruijn et al. | |
| 2020/0406523 A1 | 12/2020 | De Bruijn et al. | |

FOREIGN PATENT DOCUMENTS

| | | |
|---|---|---|
| CN | 106142622 A | 11/2016 |
| EP | 1987940 A1 | 11/2008 |
| EP | 3034268 A1 | 6/2016 |
| EP | 3283273 B1 | 2/2020 |
| JP | H0596604 A | 4/1993 |
| NL | 2014634 A | 10/2016 |
| SU | 1111869 A1 | 9/1984 |
| WO | 2016146270 A1 | 9/2016 |
| WO | 2016167646 A1 | 10/2016 |

OTHER PUBLICATIONS

Netherlands Search Report from NL Application No. 2018638, dated Dec. 15, 2017.
International Preliminary Report on Patentability from PCT Application No. PCT/EP2018/057991, dated Feb. 27, 2019.
Office Action from corresponding CN Application No. 201880021311.2, dated Mar. 26, 2021.
Office Action from corresponding JP Application No. 2019-552997, dated Dec. 2, 2021.
Office Action from corresponding TW Application No. 107111511, dated Dec. 6, 2021.
Russian Search Report from corresponding RU Application No. RU2019134845, dated Jul. 12, 2021.

* cited by examiner

EXTRUDER SYSTEM AND METHOD FOR EXTRUDING CORD-REINFORCED TIRE COMPONENTS

BACKGROUND

The invention relates to an extruder system and a method for extruding cord reinforced tire components.

WO 2016/167646 A1 discloses an extruder system and a method for extruding cord reinforced extrudate, wherein the extruder system comprises an extruder head with a die for receiving extrusion material and a cord guide for guiding cords in a common cord plane in a cord direction into the die. To allow for easy access to the cord guide, the cord guide is placed on a carriage that is slidable in or parallel to the cord plane along a linear guide to a position away from the die. While one cord guide is still actively guiding cords into the extruder head, another cord guide can already be prepared with a set of new cords while the extruder is still extruding. Hence, the changeover time for changing cord guides can be reduced significantly.

However, precise alignment and/or positioning of the slidable cord guide with respect to the die of the extruder head is subject to the tolerances between the cord guide and the extruder head. As the extruder head remains closed, the operator has no means to check the alignment and/or the positioning. Moreover, small amounts of the extrusion material will inevitably leak between the cord guide and the extruder head during the extrusion process. Said extrusion material, once vulcanized, may cause friction and/or blockage that could seriously hamper both removal and reinsertion of the cord guide.

It is an object of the present invention to provide an extruder system and a method for extruding cord reinforced tire components, wherein the alignment and/or positioning of the cord guide with respect to the die can be improved.

SUMMARY OF THE INVENTION

According to a first aspect, the invention provides an extruder system for extruding cord reinforced extrudate, in particular for tire components, wherein the extruder system comprises an extruder head with one or more flow channels for receiving an extrusion material from an extruder, a die for receiving said extrusion material from the one or more flow channels and a cord guide for guiding cords side-by-side in a cord plane into the die, wherein the extruder head is provided with an insertion slot that extends in an insertion direction parallel to the cord plane through the extruder head, wherein the one or more flow channels debouch into the insertion slot at a flow area, wherein the die and the cord guide are insertable in the insertion direction from a position completely outside of the insertion slot into a die position downstream of the flow area and a cord guide position upstream of the flow area, respectively, with respect to the insertion direction, wherein the die and the cord guide are arranged to be connected such that the die and the cord guide are simultaneously insertable into the insertion slot.

As both the die and the cord guide can be inserted in the insertion direction into the slot simultaneously, the positioning of the die with respect to the cord guide can be controlled more accurately, e.g. by already positioning the die and the cord guide with respect to each other prior to the insertion. The insertion direction is parallel to the cord plane. Hence, the cords can already be guided through the cord guide and the die prior to the insertion. The thus prepared cord guide, die and cords can be easily inserted into the insertion slot to minimize the changeover time. The cord guide and the die can also be retracted from the insertion slot like a drawer. Moreover, unlike fixed dies, the insertable die can be removed and replaced by another die, thus providing more flexibility to the die configuration.

In a preferred embodiment the extruder head is provided with an interior surface that defines the insertion slot, wherein the die is provided with a first slide surface and a second slide surface extending parallel to and on opposite sides of the cord plane and wherein the cord guide is provided with a third slide surface and a fourth slide surface extending parallel to and on opposite sides of the cord plane for sliding the die and the cord guide along said interior surface in the insertion direction. Hence, the die and the cord guide can be inserted by simply sliding them in the insertion direction into the insertion slot.

In another embodiment the extruder system comprises a holder for holding the die with respect to the cord guide. Preferably, said holder is directly connected to and/or integral with the cord guide. Hence, the rigidity of the holder with respect to the cord guide can be improved, thus improving the accuracy of the holding of the die with respect to the cord guide.

More preferably, the holder comprises a base at the cord guide, wherein the holder extends from the base towards the die to hold the die with respect to said base. The holder can extend from the base towards the die to bridge the gap between the cord guide and the die.

In a particular embodiment the holder comprises a first holding member and a second holding member that are arranged to extend from the base towards and alongside the die in the insertion direction at a first side and a second side, respectively, of the die in a transverse direction perpendicular to the insertion direction.

In a further embodiment the die is mountable to the holder in a mounting direction opposite to the insertion direction. Hence, the die can be easily mounted to the holder from a side of the holder opposite to the cord guide. Moreover, after the insertion, the die can be locked in between the holder and the extruder head to securely retain the die within the extruder head.

In an embodiment thereof the first holding member and the second holding member are provided with a first guiding element and a second guiding element, respectively, extending in a direction parallel to the mounting direction, wherein the die is provided with a first mounting element and a second mounting element which are arranged to slidably engage the first guiding element and the second guiding element, respectively, in the mounting direction. With the aforementioned combination of the mounting elements and the respective guiding elements, the die can be easily mounted to the holder by sliding.

Preferably, the cord guide comprises a first cord guide member and a second cord guide member which are arranged to be mated to each other on opposite sides of the cord plane, wherein one of the first cord guide member and the second cord guide member is directly connected to and/or integral with the holder, wherein the other of the first cord guide member and the second cord guide member is provided with a third mounting element and a fourth mounting element which are arranged to slidably engage the first guiding element and the second guiding element, respectively, in the mounting direction. Hence, the other of the first cord guide member and the second cord guide member can be mounted to the holder in the same way as the die.

More preferably, the other of the first cord guide member and the second cord guide member is arranged to be mounted between the holder and the die in the mounting direction. Thus, the other of the first cord guide member and the second cord guide member is mounted first in the mounting direction to the holder, followed by the die which can lock in the other of the first cord guide member and the second cord guide member between the die and the holder.

In one preferred embodiment the first holding member and the second holding member are provided with one or more mating surfaces which are arranged to abut the die in the insertion direction and which are spaced apart from the cord guide in the insertion direction to form the flow area between the die and the cord guide. The one or more mating surface can prevent the die from moving further in the mounting direction. Hence, an intermediate space can be kept free between the cord guide and the die, which intermediate space forms the flow area. Moreover, by allowing the die to abut the one or more mating surfaces, the positioning of the die with respect to the holder can be more accurate.

In an alternative preferred embodiment the cord guide is provided with a cord guide nose that together with the die defines the flow area, wherein the first cord guide member and the second cord guide member are provided with first mating surfaces and second mating surfaces, respectively, which are arranged to abut the die in the insertion direction and which are spaced apart from the cord guide nose in the insertion direction to form the flow area between the die and the cord guide. The mating surfaces can prevent the die from moving further in the mounting direction. Hence, an intermediate space can be kept free between the cord guide nose and the die, which intermediate space forms the flow area. Moreover, by allowing the die to abut the one or more mating surfaces, the positioning of the die with respect to the cord guide members can be more accurate.

Alternatively, the holder comprises a first holding member and a second holding member that are connectable to the sides of the cord guide in a transverse direction perpendicular to the insertion direction, wherein first holding member and the second holding member, when connected to the cord guide, extend from the cord guide towards and alongside the die in the insertion direction at a first side and a second side, respectively, of the die in the transverse direction.

In a preferred embodiment thereof the die and/or the cord guide are mountable to the holder in a mounting direction perpendicular to the cord plane. Hence, said holder provides an alternative mounting direction to the previously described embodiment in which the mounting direction was opposite to the insertion direction.

More preferably, the first holding member and the second holding member are provided with a first guiding element and a second guiding element, respectively, extending in a direction parallel to the mounting direction, wherein the die is provided with a first mounting element and a second mounting element which are arranged to slidably engage the first guiding element and the second guiding element, respectively, in the mounting direction. Hence, the die can be accurately received in said mounting direction.

In a further embodiment the cord guide comprises a first cord guide member and a second cord guide member which are arranged to be mated to each other on opposite sides of the cord plane Preferably, the first cord guide member is independently mountable to and dismountable from the second cord guide member. Hence, in the event of breakage of one or more cords, said one or more cords can be replaced easily.

Alternatively, the cord guide comprises a first cord guide member and a second cord guide member which are indivisible or formed as a Monobloc. Having separate cord guide members allows for easy preparation of the cords in the cord guide. However, having an indivisible cord guide can reduce tolerances between the cord guide members.

In another embodiment the extruder system further comprises a first coupling element for coupling the die to the cord guide, wherein the first coupling element allows for movement of the die with respect to the cord guide in the insertion direction into the die position. The first coupling element can prevent that the die accidentally falls out of the holder during handling of said holder. The first coupling element can provide a loose fit so that the die can automatically move into the die position when pressure is exerted by the extrusion material on the die in the insertion direction. More in particular, the positioning of the die in the die position can be made independent of tolerances in the mounting of the die with respect to the holder.

In an embodiment thereof the extruder head provides an abutment surface for abutting the die in a direction opposite to the insertion direction when the die is in the die position. The die can automatically move into the die position under the pressure exerted by the extrusion material on said die in the insertion direction. More in particular, the die tends to seek abutment with the abutment surface under said pressure. The abutment surfaces can resist the pressure exerted by the extrusion material on the die in the insertion direction to reliably and/or accurately retain the die within the extruder head.

In another embodiment the extruder system is further provided with a first sealing element between the first sliding surface and the interior surface and a second sealing element between the second sliding surface and the interior surface for sealing the flow area from the interior surface downstream of the first sealing element and the second sealing element with respect to the insertion direction. Hence, leakage of the extrusion material from the flow area to the interior surface downstream of the first sealing element and the second sealing element can be prevented. When the leakage cures between the sliding surfaces and the interior surface, this could generate considerable resistance that could potentially block the removal of the die from the insertion slot. Hence, by preventing said leakage, the die can be removed from the insertion slot more easily.

In an embodiment thereof the die extends in the insertion direction along the interior surface over a die length, wherein the first sealing element and the second sealing element are located at less than half the die length from the flow area when the die is in the die position. By keeping the surface area of the interior surface that can be affected by the leakage to a minimum, the resistance to removal of the die with respect to the insertion slot.

In a further embodiment thereof the first sealing element and the second sealing element are sealing gutters that are formed in the die, wherein the sealing gutters are open towards the interior surface. The sealing gutters can receive an amount of the extrusion material that leaks from the flow area. Said amount quickly cures in the sealing gutter and can thereby automatically form a reliably seal with respect to the interior surface.

In another embodiment the die or the one or more flow channels are provided with a knife at the flow area that is arranged to cut-off extrusion material remaining in the flow area from the extrusion material in the one or more flow channels when the die and the cord guide are retracted from the insertion slot in a retraction direction opposite to the insertion direction. Hence, the die can be retracted through extrusion material that is present in the flow channels at the moment of said retraction. The cut-off extrusion material can be retracted together with the die and the cord guide from the insertion slot to keep the insertion slot clear for easy insertion.

In another embodiment the die is provided with a die outlet opening that forms the extrusion material into the extrudate and an accumulation recess that is located between the first slide surface and the die outlet opening for accumulating extrusion material that is scraped off from the interior surface by insertion of the die in the insertion direction. By collecting the scraped-off extrusion material in a dedicated accumulation recess, it is prevented that said scraped-off extrusion material is pushed out of the insertion slot into the die opening or onto the extrudate leaving the die.

In yet another embodiment the extruder system is further provided with a third sealing element between the third sliding surface and the interior surface and a fourth sealing element between the fourth sliding surface and the interior surface for sealing the flow area from the interior surface upstream of the third sealing element and the fourth sealing element with respect to the insertion direction. Similar to the sealing elements at the die, leakage of the extrusion material from the flow area to the interior surface upstream of the third sealing element and the fourth sealing element can be prevented. By preventing said leakage, the cord guide can be removed from the insertion slot more easily.

In an embodiment thereof the cord guide extends in the insertion direction along the interior surface over a cord guide length, wherein the third sealing element and the fourth sealing element are located at less than half the cord guide length from the flow area when the cord guide is in the cord guide position. By keeping the surface area of the interior surface that can be affected by the leakage to a minimum, the resistance to removal of the cord guide with respect to the insertion slot can be reduced.

In a further embodiment thereof the third sealing element and the fourth sealing element are sealing gutters that are formed in the cord guide, wherein the sealing gutters are open towards the interior surface. The sealing gutters can receive an amount of the extrusion material that leaks from the flow area. Said amount quickly cures in the sealing gutter and can thereby automatically form a reliably seal with respect to the interior surface.

In another embodiment the die and the cord guide have a die height and a cord guide height, respectively, in a direction normal to the cord plane, wherein the die height is smaller than the cord guide height. Hence, the die can be easily retracted in the retraction direction without contact the insertion slot at the cord guide position. In particular, it can be prevented that the die bites the interior surface of the slot at the cord guide position.

In another embodiment the insertion slot has a first slot height and a second slot height at the die position and the cord guide position, respectively, in a direction normal to the cord plane, wherein the first slot height is smaller than the second slot height. The transition from the second slot height to the first slot height can form a step that can stop the cord guide from moving further than the cord guide position in the insertion direction through the insertion slot.

Alternatively, the die height H1 and the cord guide height H2 are equal and/or the first slot height and the second slot height are equal.

In yet another embodiment the extruder system further comprises an actuator for aiding the insertion and/or removal of the die and/or the cord guide in the insertion direction and a retraction direction opposite to the insertion direction, respectively. The actuator can facilitate the removal when the die and/or the cord guide are not easily reached by hand or when the resistance to removal is so high that manual removal is not possible.

In yet another embodiment the one or more flow channels comprise a first flow channel that debouches into the flow area from a first side of the cord plane and a second flow channel that debouches into the flow area from a second side of the cord plane opposite to the first side. Hence, the cords can be embedded from both sides, which is typical for tire components.

In an embodiment thereof the die and the cord guide are provided with a die inlet opening and a cord guide nose, respectively, that together form the flow area which is aligned with and/or connects to the first flow channel at the first side of the cord plane and the second flow channel at the second side of the cord plane when the die and the cord guide are in the die position and the cord guide position, respectively. Hence, when the die and the cord guide are in the die position and the cord guide position, respectively, the flow areas can form a seamless or substantially seamless continuation of the respective flow channels.

In a further embodiment a first cover is provided between the first extruder head member and the first clamping member and a second cover is provided between the second extruder head member and the second clamping member for sealing the first flow channel and the second flow channel, respectively, from the extruder head. Hence, the extruder head can be kept from direct contact with the extrusion material, thus keeping the extruder head clean.

According to a second aspect, the invention provides a method for extruding cord reinforced extrudate, in particular for tire components, with use of the extruder system according to any one of the aforementioned embodiments, wherein the method comprises the steps of connecting the die and the cord guide and inserting the die and the cord guide simultaneously from a position completely outside of the insertion slot in the insertion direction in the insertion slot into the die position and the cord guide position, respectively.

The method and its embodiments relate to the practical implementation of the aforementioned extruder head and thus have the same technical advantages which will not be repeated hereafter.

In another embodiment of the method the extruder head is provided with an interior surface that defines the insertion slot, wherein the method comprises the step of sealing the die and the cord guide with respect to the interior surface by allowing an amount of extrusion material to cure between the die and the interior surface and between the cord guide and the interior surface.

In another embodiment of the method the die or the one or more flow channels are provided with a knife at the flow area, wherein the method comprises the step of using the knife to cut-off extrusion material remaining in the flow area from the extrusion material in the one or more flow channels when the die and the cord guide are retracted from the insertion slot in a retraction direction opposite to the insertion direction.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-9 show an extruder system 1 according to an exemplary first embodiment of the invention. Said extruder system 1 is used for embedding cords 91 into an extrusion material 93 to extrude cord reinforced extrudate 92, in particular for tire components.

Figure 2:
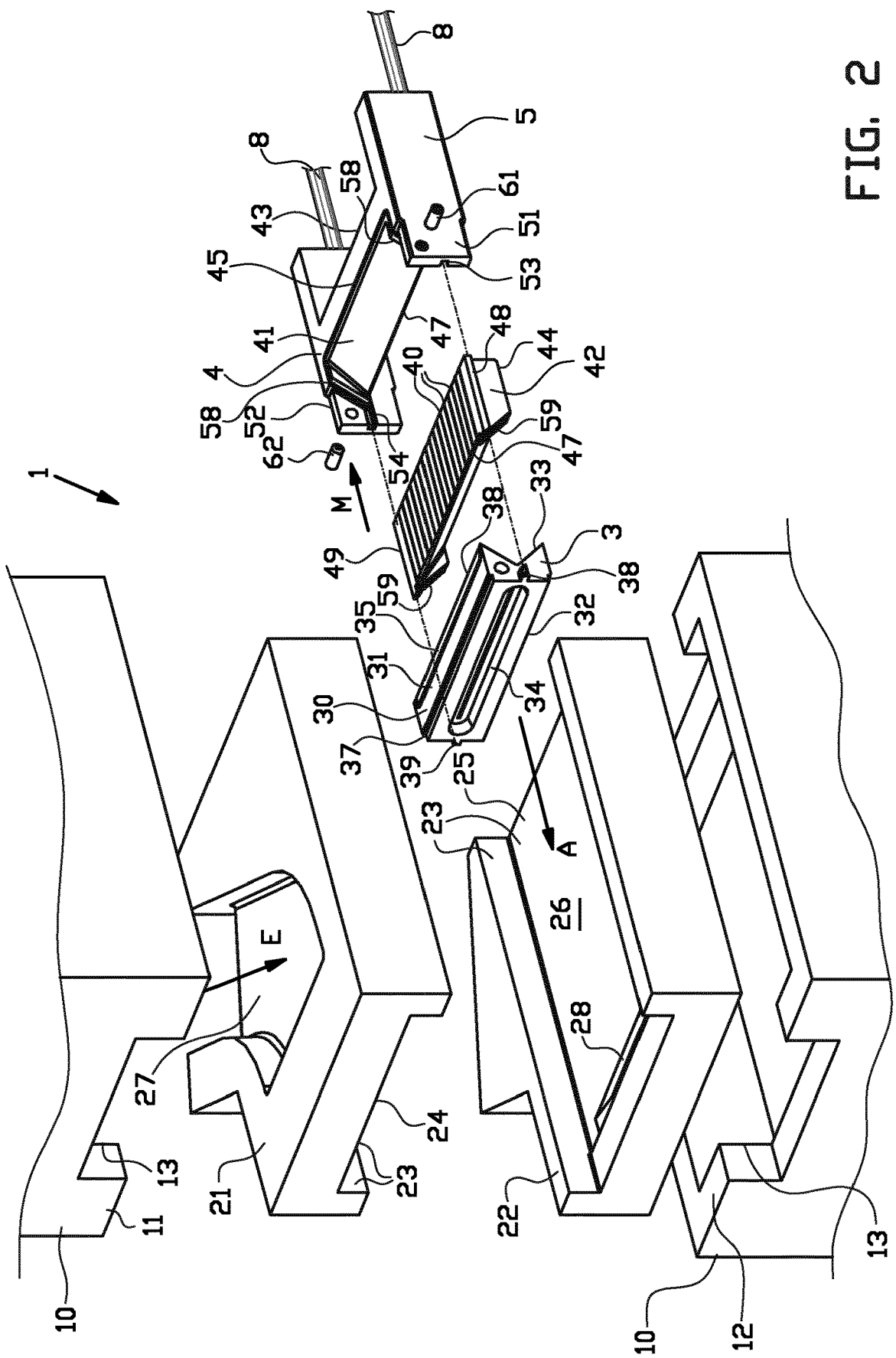
FIG. 2 shows an exploded view of the extruder system according to FIG. 1, including a first extruder head member and a second extruder head member.

As shown in the exploded view of FIG. 2, the extruder system 1 comprises an extruder head 10 for receiving extrusion material 93 from an extruder (not shown) in an extrusion direction E. The extruder head 10 is provided with a first flow channel 27 and a second flow channel 28 for directing the extrusion material 93 towards the cords 91. The extruder system 1 further comprises a die 3 for receiving the extrusion material 93 from the one or more flow channels 27, 28 and a cord guide 4 for guiding the cords 91 side-by-side in a cord plane P into the die 3. The die 3 and the cord guide 4 are clamped and/or enclosed from opposite sides of the cord plane P by a first clamping member 21 and a second clamping member 22.

In this exemplary embodiment, the extruder head 10 comprises a first extruder head member 11 and a second extruder head member 12 which are arranged to be mated to each other from opposite sides of the cord plane P in order to clamp and/or enclose the first clamping member 21 and the second clamping member 22, respectively. Hence, the first clamping member 21 and the second clamping member 22 form extruder tooling that can be replaced depending on the shape of the die 3 and the cord guide 4 to be clamped and/or enclosed. In this exemplary embodiment, the first flow channel 27 and the second flow channel 28 extend in the first clamping member 21 and the second clamping member 22. Alternatively, the flow channels 27, 28 may also be at least partially formed in the first extruder head member 11 and the second extruder head member 12. The first extruder head member 11 and the second extruder head member 12 preferably extend at least partially in front of the die 3 to form an abutment surface 13 for containing said die 3 in the extruder head 10.

Figure 1:
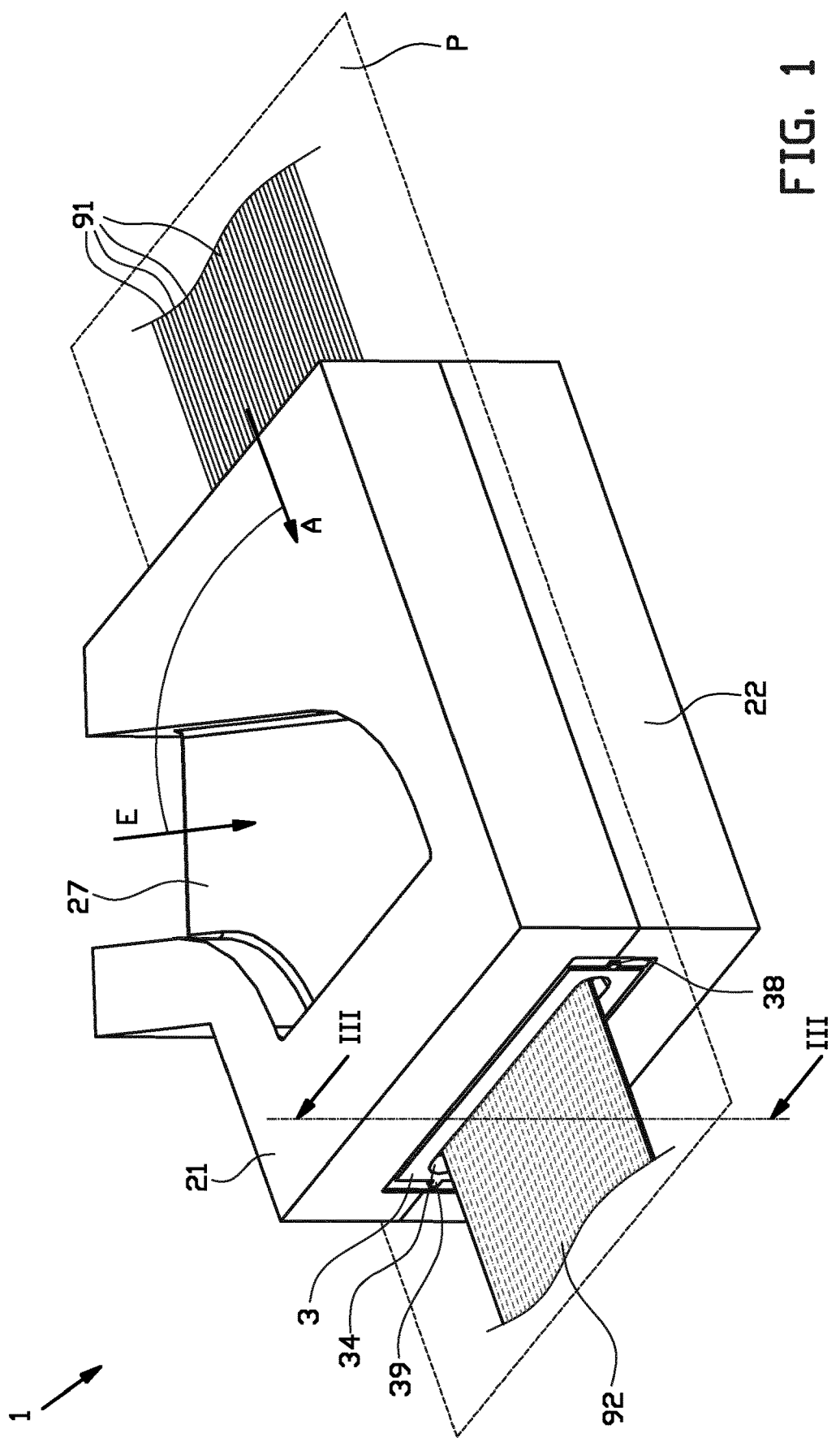
FIG. 1 shows an isometric view of an extruder system according to a first embodiment of the invention.

As shown in FIG. 1, the cords 91 are arranged to extend in an insertion direction A parallel to the cord plane P into and out of the extruder head 10. The extrusion direction E preferably orientated at an angle of approximately sixty (60) degrees with respect to the insertion direction A to provide an optimal distribution of extrusion material 93 over the width of the extruder head 10. In this exemplary embodiment, the extrusion direction E is also parallel to the cord plane P. Because of the angle between the extrusion direction E and the cords 91 extending in the insertion direction A, the extruder head 10 can be considered as a crosshead type extruder head 10.

Figure 3:
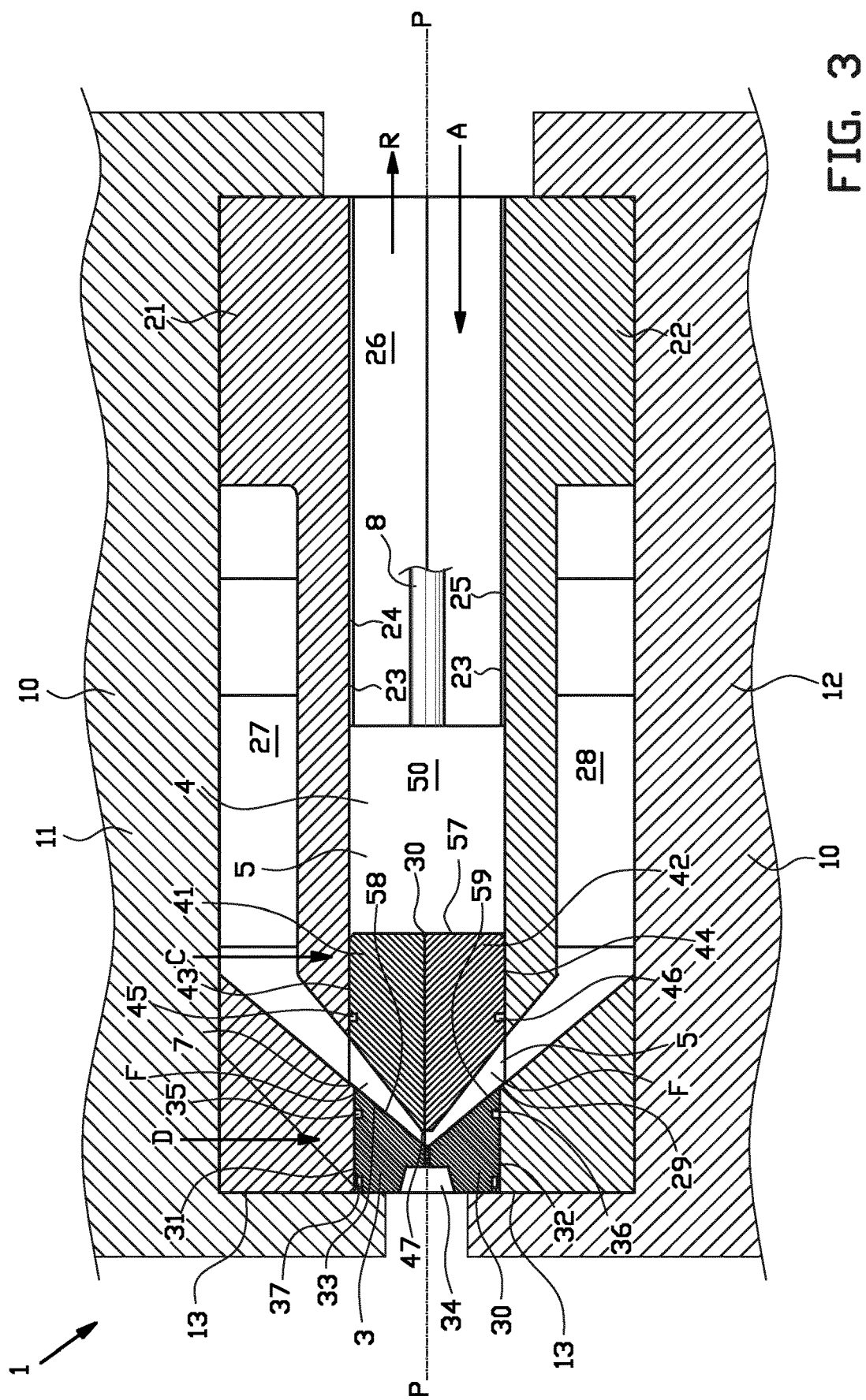
FIG. 3 shows a cross section of the extruder system according to the line III-III in FIG. 1.
Figure 4:
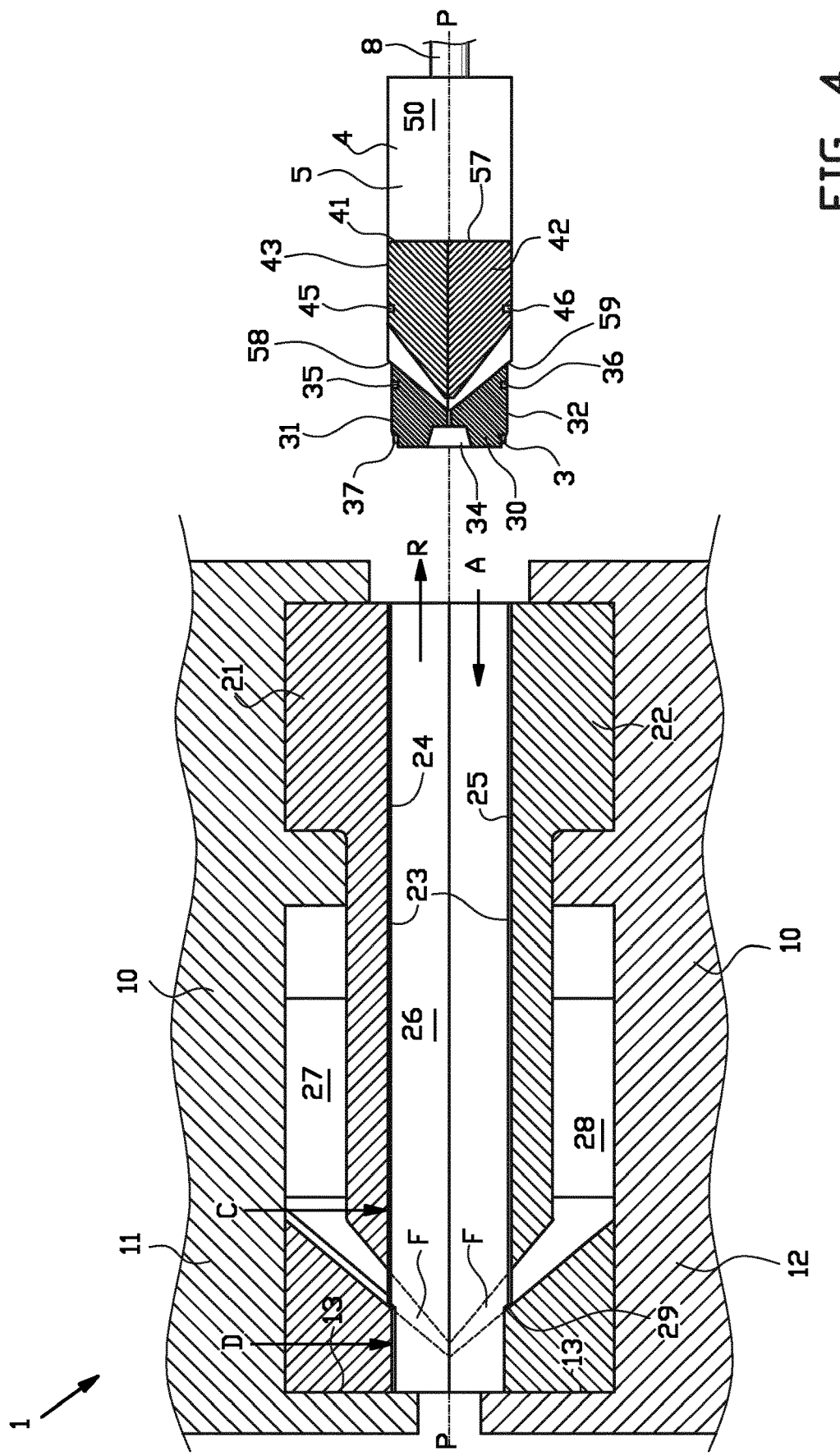
FIG. 4 shows a cross section of the extruder system according to FIG. 3 with a die and cord guide retracted from said extruder system.

As shown in FIGS. 2, 3 and 4, the extruder head 10 is provided with an insertion slot 26 that extends in the insertion direction A through the extruder head 10. As shown in FIG. 3, the insertion slot 26 is arranged for receiving the die 3 and the cord guide 4 in the insertion direction A into a die position D downstream and a cord guide position C. The die 3 and the cord guide 4 are retractable from the insertion slot 26 in a retraction direction R opposite to the insertion direction A. The first flow channel 27 and the second flow channel 28 debouch into the insertion slot 26 at a flow area F between the die position D and the cord guide position C. Hence, the die position D is located downstream of the flow area F with respect to the insertion direction A and the cord guide position C is upstream of the flow area F with respect to the insertion direction A. As best seen in FIG. 4, the insertion slot 26 thus extends all the way through the first clamping member 21 and the second clamping member 22 in the insertion direction A up to and including the die position D.

More in particular, the extruder head 10 is provided with an interior surface 23 that defines the insertion slot 26. Said interior surface 23 is formed by a first slot surface 24 of the first clamping member 21 facing towards the cord plane P from a first side of the cord plane P and a second slot surface 25 of the second clamping member 22 facing towards the cord plane P from an opposite second side of the cord plane P.

As shown in FIGS. 2, 3 and 4, the die 3 is provided with a die body 30 with first slide surface 31 and a second slide surface 32 extending parallel to and on opposite sides of the cord plane P for sliding along the first slot surface 24 and the second slot surface 25, respectively, in the insertion direction A and/or the retraction direction R The die 3 further comprises a die inlet opening 33 that is arranged to be aligned with the first flow channel 27 and the second flow channel 28 in the die position D for receiving the extrusion material 93 from said respective flow channels 27, 28 and a die outlet opening 34 for shaping the cord reinforced extrudate 92 that leaves the extruder head 10.

The cord guide 4 is provided with a first cord guide member 41 and a second cord guide member 42 which are arranged to be mated to each other from opposite sides of the cord plane P to enclose and guide the cords 91 that are received therein between. One of the cord guide members 41, 42, in this example the second cord guide member 42, is provided with a plurality of cord channels 40 for receiving the cords 91. The second cord guide member 42 is preferably removable and/or interchangeable with respect to the first cord guide member 41 to allow for different cord channel configurations. Similar to the die 3, the cord guide 4 is provided with a third slide surface 43 and a fourth slide surface 44 extending parallel to and on opposite sides of the cord plane P for sliding along the first slot surface 24 and the second slot surface 25, respectively, in the insertion direction A and/or the retraction direction R The first cord guide member 41 and the second cord guide member 42 taper towards each other in the insertion direction A from opposite sides of the cord plane P to form a pointy cord guide nose 47 facing towards the die 3. The die inlet opening 33 and the cord guide nose 47 are arranged for together forming the flow area F when the die 3 and the cord guide 4 are in the die position D and the cord guide position C, respectively. Said flow area F is aligned with the first flow channel 27 at the first side of the cord plane P and with the second flow channel 28 at the second side of the cord plane P.

Preferably, the die 3 and the cord guide 4 are arranged to be connected so that they may be inserted into and/or retracted from the insertion slot 26 simultaneously and/or in unison in the insertion direction A and the retraction direction R, respectively. For this purpose, the extruder system 1 comprises a holder 5 for holding the die 3 with respect to the cord guide 4. In this particular embodiment, as best seen in FIG. 2, the holder 5 is a part of the cord guide 4. More preferably, one of the cord guide members 41, 42, in this example the first cord guide member 41, forms the base 50 of the holder 5 and extends towards the die 3 to hold the die 3 with respect to said base 50. In this exemplary embodiment, the holder 5 comprises a first holding member 51 and a second holding member 52 that are arranged to extend from the base 50 towards and alongside the die 3 in the insertion direction A at opposite sides of the die 3 in a transverse direction T perpendicular to the insertion direction A.

Figure 7:
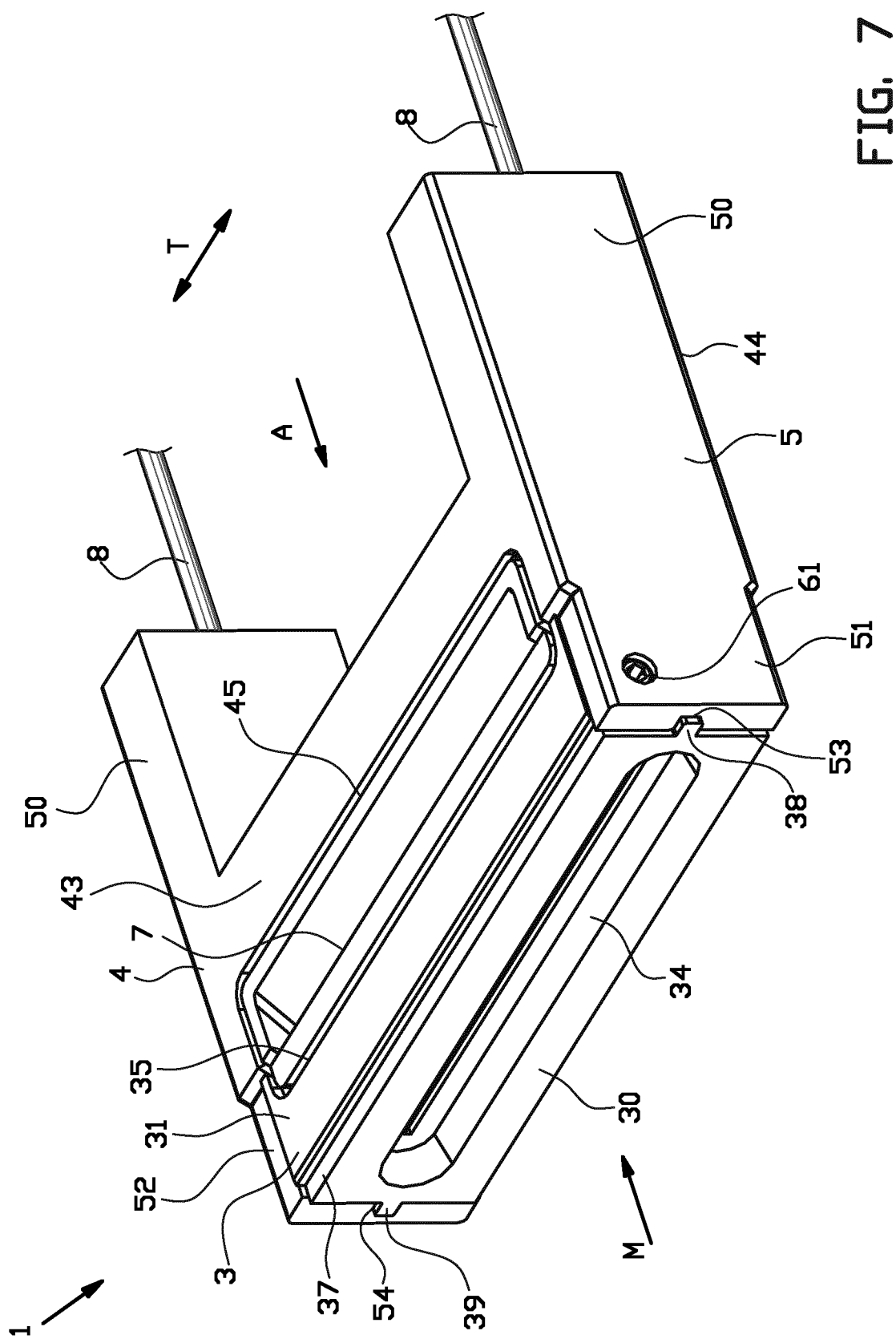
FIGS. 7, 8 and 9 show isometric view of the die, the cord guide and a holder connecting said die to said cord guide, during the steps of removing the die and a cord guide member of the cord guide from the holder.
Figure 8:
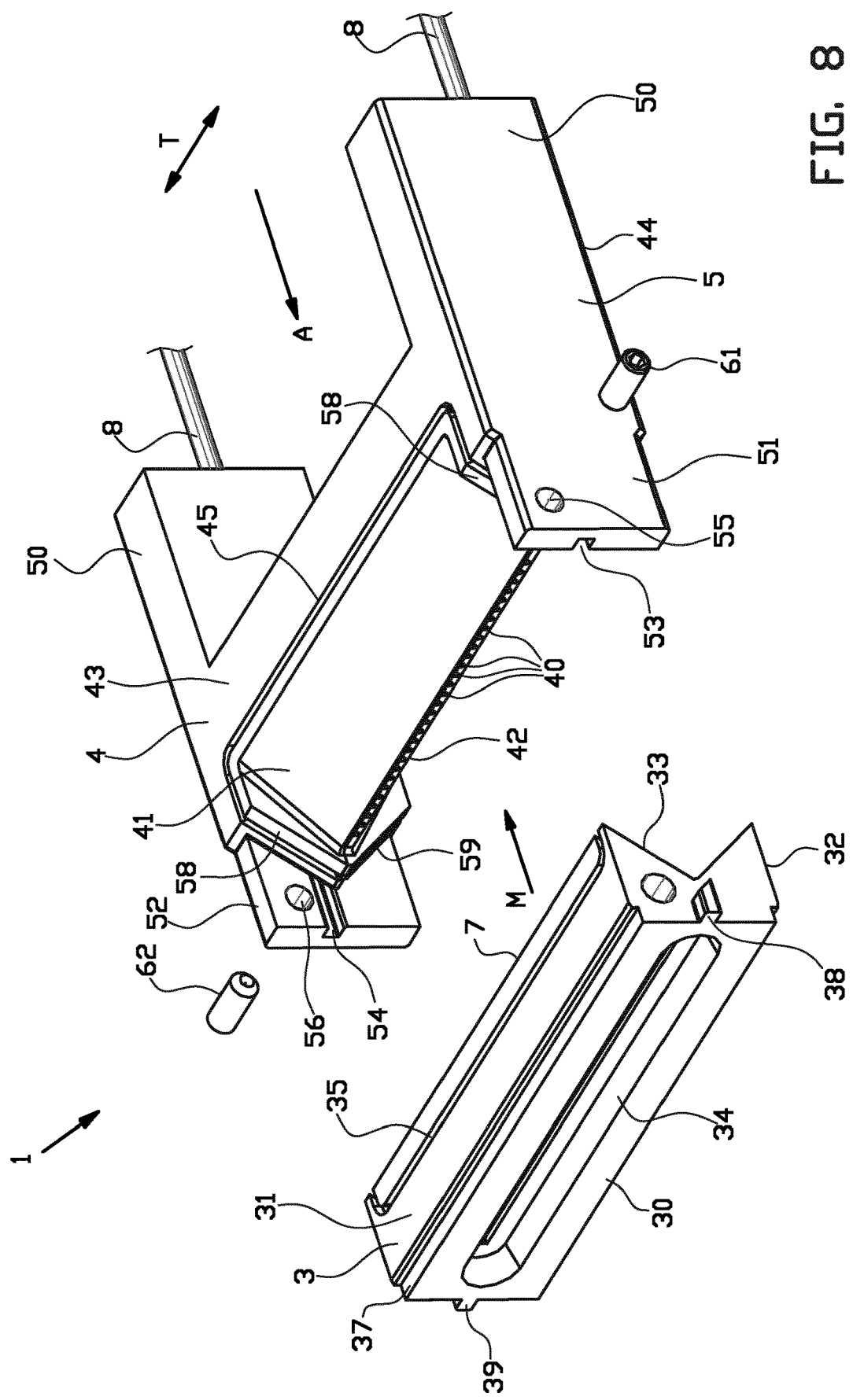

As shown in FIGS. 7 and 8, the die 3 is mountable to the holder 5 in a mounting direction M opposite to the insertion direction A. In particular, the first holding member 51 and the second holding member 52 are provided with a first guiding element 53 and a second guiding element 54 extending in a direction parallel to the mounting direction M. The die 3 is provided with a first mounting element 38 and a second mounting element 39 which are arranged to slidably engage the first guiding element 53 and a second guiding element 54, respectively. Hence, the die 3 can be slidably mounted to the holder 5 in the mounting direction M and removed from the holder 5 in a direction opposite to the mounting direction M.

To retain the die 3 with respect to the cord guide 4, the extruder system 1 is provided with a first coupling element 61 and a second coupling element 62 for coupling the die 3 to the cord guide 4. The coupling elements 61, 62 prevent that the die 3 is separated from the cord guide 4 in a direction opposite to the mounting direction M. In this exemplary embodiment, the coupling elements 61, 62 are formed by fasteners which are insertable through corresponding mounting holes 55, 56 in the first holding member 51 and the second holding member 52 and that engage and retain the die 3 with respect to said mounting holes 55, 56. Preferably, the mounting holes in the die 3 and/or in the holding members 51, 52 are formed as slightly slotted holes which are elongate in the mounting direction M to allow for movement of the die 3 with respect to the cord guide 4 in the insertion direction A. Hence, the die 3 is allowed to move slightly when the extrusion material 93 exerts pressure on said die 3 in the insertion direction A. Preferably, the die 3 is allowed to move into abutment with the abutment surface 13 of the extruder head 10 directly in front of the die position P to ensure automatic and/or accurate positioning of the die 3 with respect to the extruder head 10 in use.

Figure 9:
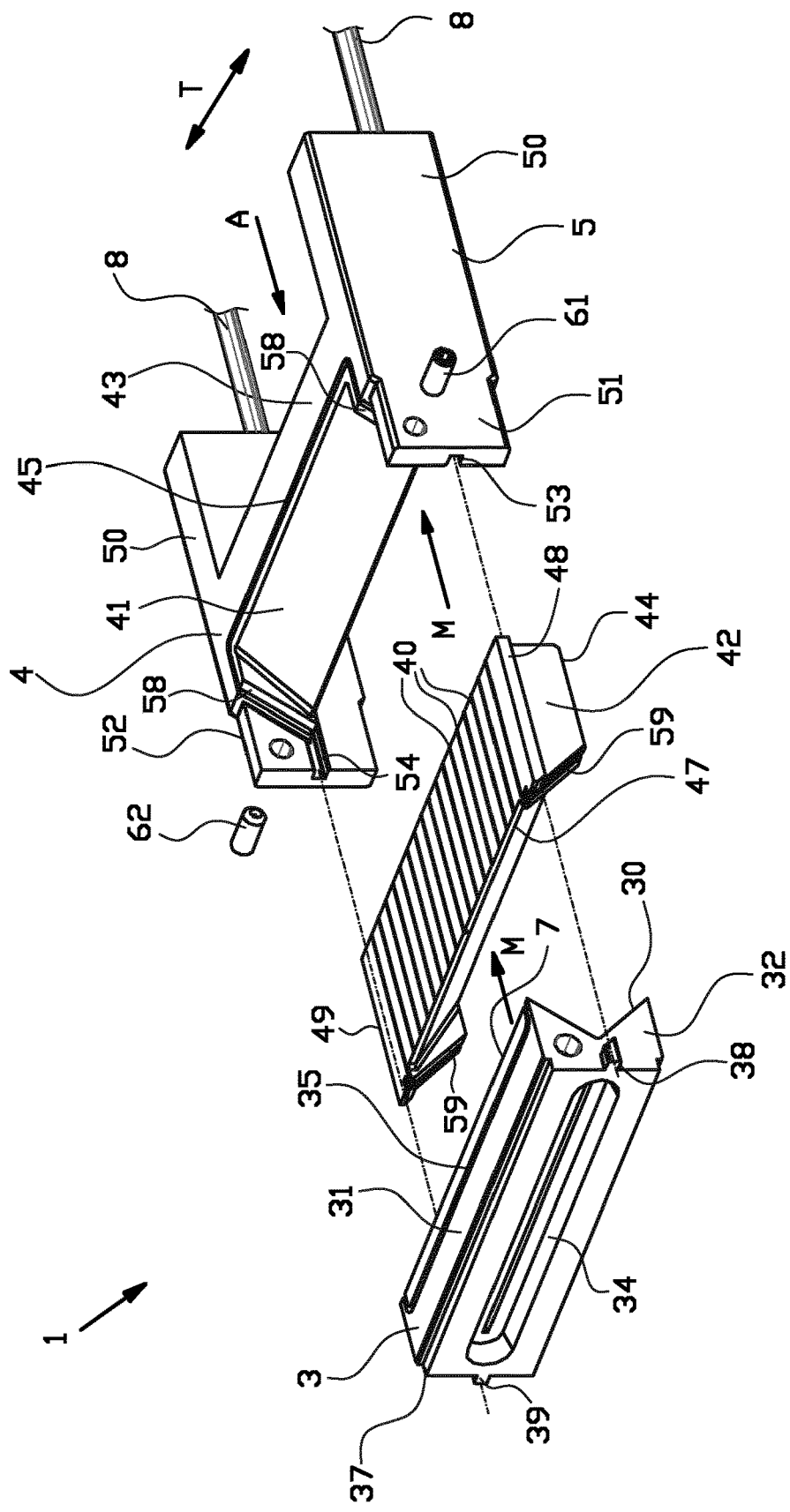

As shown in FIGS. 8 and 9, the second cord guide member 42 is mountable to the holder 5—formed by the first cord guide member 41—in substantially the same manner as the die 3. In particular, the first guiding element 53 and the second guiding element 54 extend along the cord guide position C to receive the second cord guide member 42 in said cord guide position C at the same position as the first cord guide member 41, yet at the opposite side of the cord plane P. The second cord guide member 42 is provided with a third mounting element 48 and a fourth mounting element 49 which are arranged to slidably engage the first guiding element 53 and the second guiding element 54, respectively. Note that the first guiding element 53 and the second guiding element 54 are thus arranged for receiving the mounting elements 38, 39, 48, 49 of both the die 3 and the cord guide 4. Hence, the second cord guide member 42 can be slidably mounted to the holder 5 in the mounting direction M and removed from the holder 5 in a direction opposite to the mounting direction M The second cord guide member 42 is arranged to be mounted between the holder 5 and the die 3 in the mounting direction M. In use, pressure exerted by the extrusion material on the second cord guide member 42 in the mounting direction M will keep said second cord guide member 42 securely in position. Preferably, the base 50 of the holder 5 is provided with a back surface 57 to stop the second cord guide member 42 from moving further in the mounting direction M with respect to the first cord guide member 41.

The guiding elements 53, 54 and the mounting elements 38, 39, 48, 49 are preferably formed as male-female elements, e.g. a slot and a rim engaging said slot.

Preferably, the first holding member 51 and the second holding member 52, or alternatively the first cord guide member 41 and the second cord guide member 42, are provided with one or more mating surfaces 58, 59, as shown in FIG. 8. The mating surfaces 58, 59 are spaced apart from the cord guide nose 47. The mating surfaces 58, 59 are arranged for abutting the die 3 in the insertion direction A to form or keep clear the flow area F between the die 3 and the cord guide 4. In this exemplary embodiment, the mating surfaces 58, 59 are complementary in shape to the die inlet opening 33 for closely abutting the die 3 at said die inlet opening 33.

Figure 5:
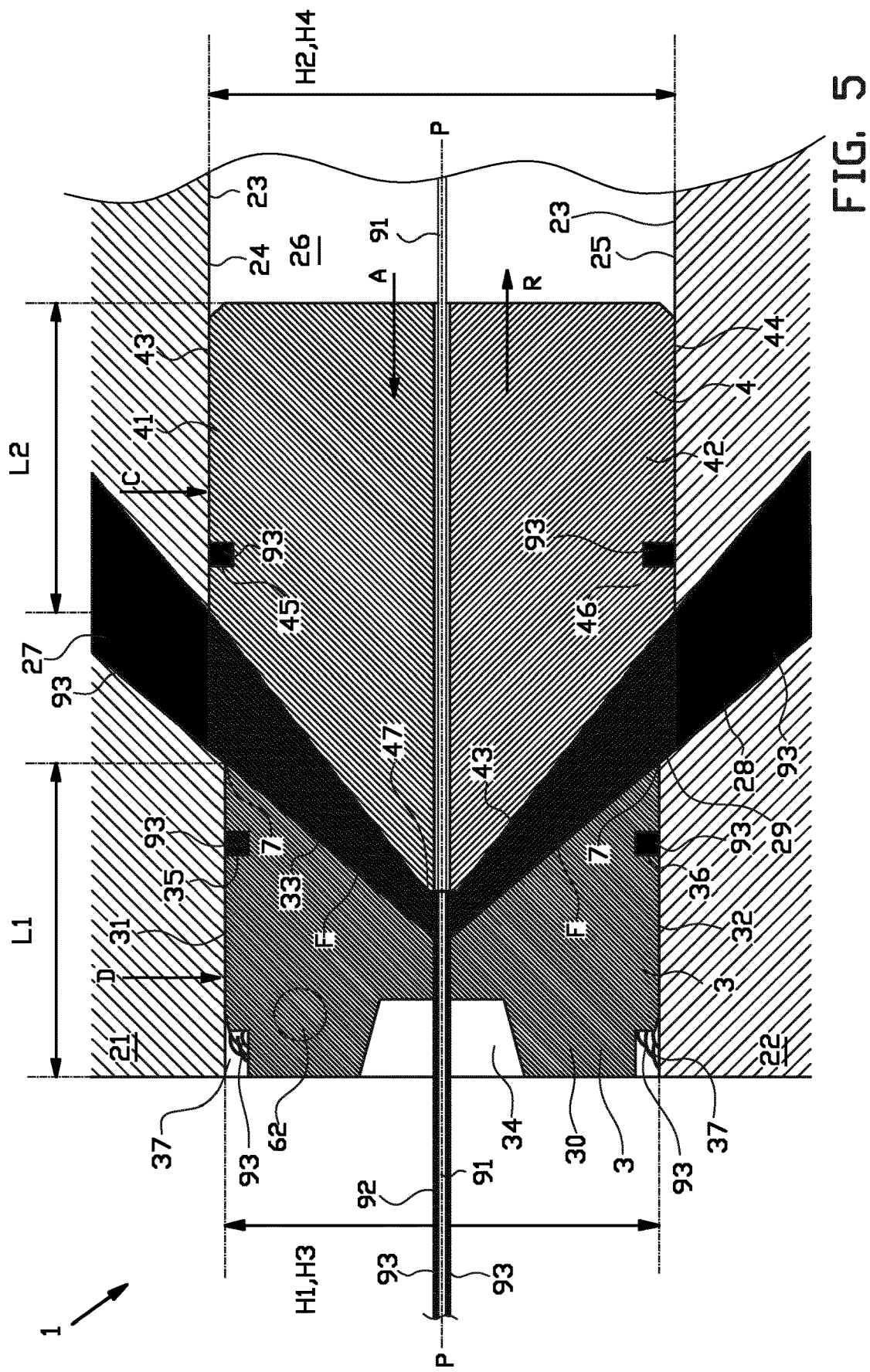
FIG. 5 shows a detail of the extruder system according to FIG. 3.

As best seen in FIG. 4, the extruder system 1 is further provided with a first sealing element 35 between the first sliding surface 31 and the interior surface 23 and a second sealing element 36 between the second sliding surface 32 and the interior surface 23 for sealing the flow area F from the interior surface 23 downstream of the first sealing element 35 and the second sealing element 36 with respect to the insertion direction A. As shown in FIG. 7, the first sealing element 35 (and the second sealing element 36 which is hidden from view in FIG. 7) extend in the transverse direction T perpendicular to the insertion direction A. As shown in FIG. 5, the first sealing element 35 and the second sealing element 36 are at a distance spaced apart from the flow area F. In particular, the die 3 extends in the insertion direction A along the interior surface 23 over a die length L1, wherein the first sealing element 35 and the second sealing element 36 are located at less than half, and preferably less than a third of the die length L1 from the flow area F when the die 3 is in the die position D.

In this exemplary embodiment, the first sealing element 35 and the second sealing element 36 are formed as sealing gutters 35, 36 that are formed in the first sliding surface 31 and the second sliding surface 32, respectively. The sealing gutters 35, 36 are open towards the interior surface 23. Moreover, the sealing gutters are in fluid communication with the flow area F at the ends of the die 3 in the transverse direction T. In use, as shown in FIG. 5, small amounts of extrusion material 93 may leak from the flow area F into the aforementioned sealing gutters 35, 36. Said leaked extrusion material 93 is allowed to harden, settle, cure and/or vulcanize in the sealing gutters 35, 36 to form a reliable seal between the sliding surfaces 31, 32 of the die 3 and the interior surface 23.

Similarly, as shown in FIG. 4, the cord guide 4 is provided with a third sealing element 45 between the third sliding surface 43 and the interior surface 23 and a fourth sealing element 46 between the fourth sliding surface 44 and the interior surface 23 for sealing the flow area F from the interior surface 23 upstream of the third sealing element 45 and the fourth sealing element 46 with respect to the insertion direction A. Again, the third sealing element 45 and the fourth sealing element 46 extend in the transverse direction T perpendicular to the insertion direction A at a distance spaced apart from the flow area F. In particular, the cord guide 4 extends in the insertion direction A along the interior surface 23 over a cord guide length L2, wherein the third sealing element 45 and the fourth sealing element 46 are located at less than half the cord guide length L2 from the flow area F when the cord guide 4 is in the cord guide position C.

In this exemplary embodiment, also the third sealing element 45 and the fourth sealing element 46 are formed as sealing gutters 45, 46 which function in the same way as the sealing gutters 35, 36 of the die 3 to receive leaked extrusion material 93 to seal the flow area F from the interior surface 23 upstream of the sealing gutters 45, 46.

The leaked extrusion material 93, once hardened, settled, cured and/or vulcanized, can cause considerable friction between the interior surface 23 and the die 3 or the cord guide 4, thereby hampering the retraction thereof in the retraction direction R Hence, by sealing a considerable part of the sliding surfaces 31, 32, 43, 44 from the flow are F, it can be prevented that a large surface area of the sliding surfaces 31, 32, 43, 44 and/or the interior surface 23 of the insertion slot 26 is covered by leaked extrusion material 93. The die 3 and the cord guide 4 can thus be removed and/or reinserted more easily.

As shown in FIG. 5, the die 3 and the cord guide 4 have a die height H1 and a cord guide height H2, respectively, in a direction normal to the cord plane P. The insertion slot 26 has a first slot height H3 and a second slot height H4 at the die position D and the cord guide position C, respectively, in a direction normal to the cord plane P. The first slot height H3 is the same or substantially the same as the die height H1 so that the die 3 can be slidably received in said first slot height H3. Similarly, the second slot height H4 is the same or substantially the same as the cord guide height H2 so that the cord guide 4 can be slidably received in said second slot height H4. The die height H1 and the first slot height H3 are smaller than the cord guide height H2 and the second slot height H4, respectively. Hence, as shown in FIG. 4, an edge or step 29 is formed in the insertion slot 26 at the transition from the second slot height H4 to the first slot height H3. Said step 29 stops the cord guide 4 from moving further in the insertion slot 26 beyond the cord guide position C. By having a die height H1 that is smaller than the cord guide height H2, the die 3 can be removed more easily from the insertion slot 26 and is less likely to bite into or reattach to the interior surface 23 of the insertion slot 26 at the cord guide position C.

Figure 6:
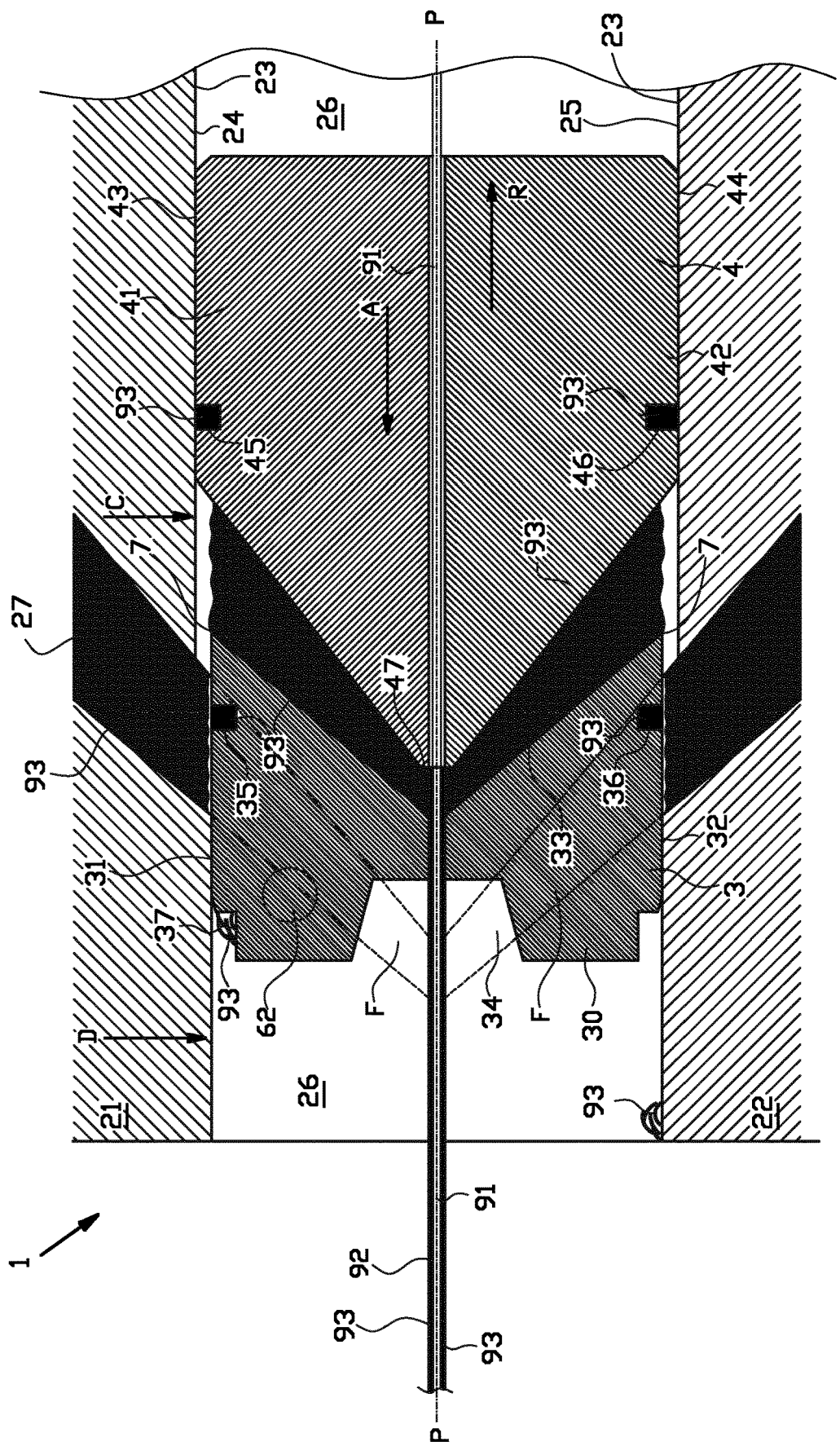
FIG. 6 shows a detail of the extruder system during the retraction of the die and the cord guide from said extruder system.

When the die 3 and the cord guide 4 are to be retracted in the retraction direction R, as shown in FIG. 5, the flow of extrusion material 93 is temporarily interrupted. However, a considerable amount of extrusion material 93 remains in the flow area F between the die 3 and the cord guide 4. Said extrusion material 93 is directly connected to the extrusion material 93 in the respective flow channels 27, 28 upstream of the flow area F. To facilitate the removal of the die 3 and the cord guide 4 from the insertion slot 26, the die 3 is provided with a knife 7. The knife 7 is formed by two sharp edges 7 at the end of the die 3 facing in the retraction direction R The sharp edges 7 are preferably formed by the terminal edges of the sliding surfaces 31, 32 of the die 3. When the die 3 and the cord guide 4 are retracted in the retraction direction R, as shown in FIG. 6, the extrusion material 93 between the die 3 and the cord guide 4 is cut-off from the extrusion material 93 in the flow channels 27, 28. The cut-off extrusion material 93 can be cleaned from between the die 3 and the cord guide 4 when the die 3 and the cord guide 4 are removed from the insertion slot 26.

When the die 3 is inserted into the insertion slot 26, the die 3 scrapes off and pushes forwards extrusion material 93 that has adhered to the interior surface 23 of the insertion slot 26 during a previous cycle of the extrusion process. As further shown in FIG. 5, the die 3 is provided with an accumulation recess 37 that is located between the first slide surface 31 and the die outlet opening 34 for accumulating extrusion material 93 that is scraped off from the interior surface 23 during the insertion of the die 3 in the insertion direction A. Said accumulation recess 37 can collect and retain the scraped-off extrusion material 93 and prevent that said scraped-off extrusion material 93 falls into the die opening 34 or onto the extrudate 92. The scraped-off extrusion material 93 can be cleaned from the die 3 when the die 3 is removed from the insertion slot 26.

Optionally, the extruder system 1 is provided with an actuator 8, e.g. a piston or a linear drive, for aiding the insertion and/or removal of the die 3 and/or the cord guide 4 in the insertion direction A and the retraction direction R opposite to the insertion direction A, respectively.

A method for extruding cord reinforced extrudate 92, in particular for tire components, with use of the aforementioned extruder system 1 will be elucidated hereafter with reference to FIGS. 1-9.

FIG. 4 shows the situation prior to insertion or the situation after removal. The die 3 and the cord guide 4 are both completely outside of the insertion slot 26 in the retraction direction R The die 3 is connected to the cord guide 4 by the holder 5. The coupling element 61, as shown in FIG. 7, prevents that the die 3 accidentally falls out of the holder 5. In the case in which the die 3 and the cord guide 4 have just been removed, the die 3 and the cord guide 4 can be separated, as shown in FIGS. 7, 8 and 9 to clean the parts thereof. In the case in which the die 3 and the cord guide 4 are clean, they are ready for simultaneous insertion.

FIG. 3 shows the situation after insertion of the die 3 and the cord guide 4 in the insertion direction A in the insertion slot 26 into the die position D and the cord guide position C. The die 3 and the cord guide 4 can optionally be pushed into the insertion slot 26 with the use of the actuator 8. Any scraped-off extrusion material 93 is collected in the accumulation recess 37 at the die 3, as shown in FIG. 5. The flow of extrusion material 93 is restarted and extrusion material 93 is allowed to enter the flow area F formed between the die 3 and the cord guide 4. Pressure exerted by the extrusion material 93 on the die 3 and the cord guide 4 in the insertion direction A and the retraction direction R, respectively, ensures that both the die 3 and the cord guide 4 remain in their respective positions. In particular, the die 3 is arranged to abut the abutment surface 13 of the extruder head 10 directly in front of the die 3 in the insertion direction A. Small amounts of extrusion material 93 have leaked into and cured in the respective sealing elements 35, 36, 45, 46 to seal the flow area F from the rest of the interior surface 23 of the insertion slot 26.

When removing the die 3 and the cord guide 4 in the retraction direction R, as for example shown in FIG. 6, the knife 7 at the die 3 cuts-off the extrusion material 93 remaining in the flow area F from the extrusion material 93 in the flow channels 27, 28. The die 3 and the cord guide 4 can optionally be retracted in the retraction direction R with the use of the actuator 8.

Figure 10:
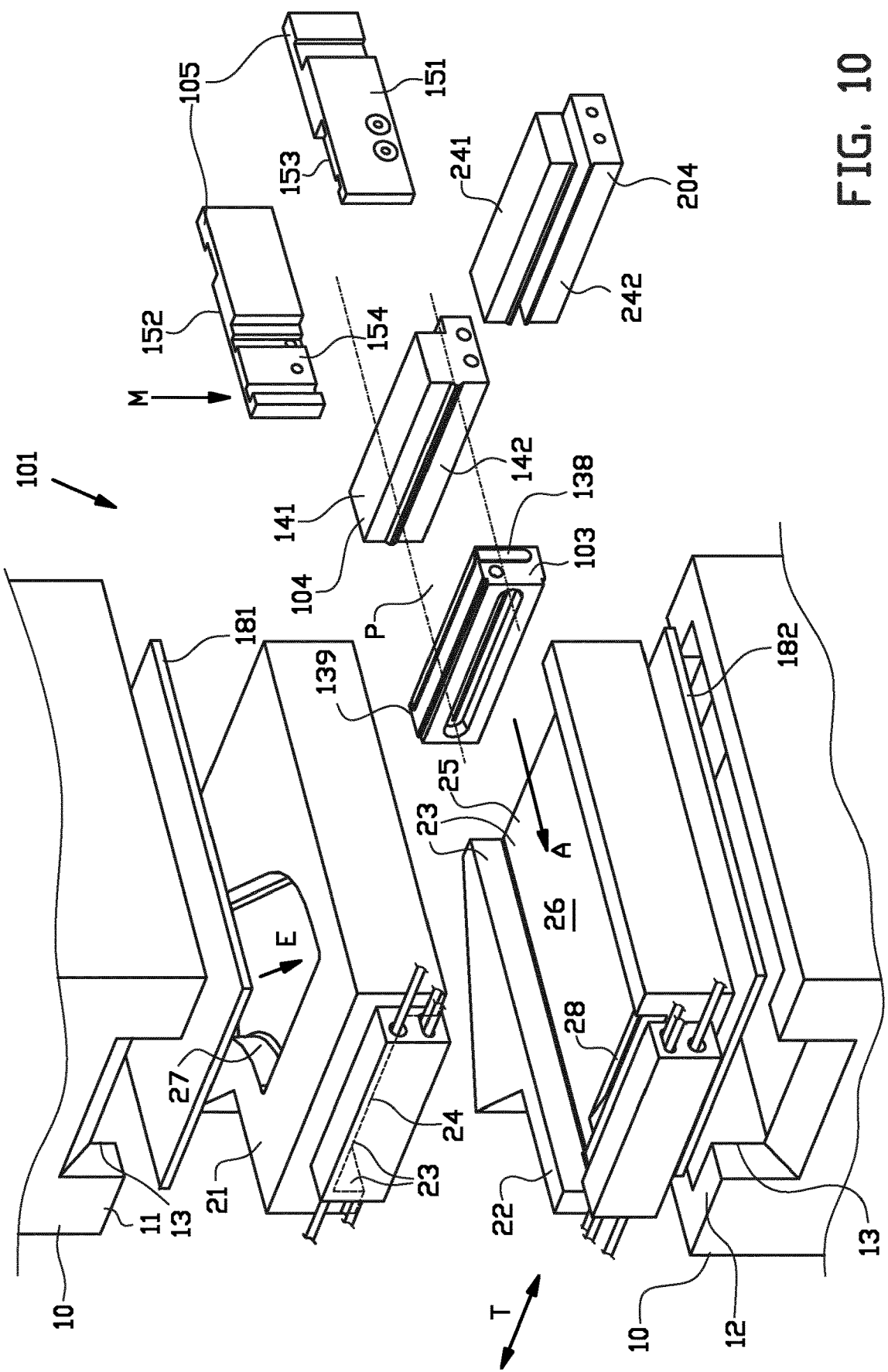
FIGS. 10 and 11 shows an exploded view and a cross section, respectively, of an alternative extruder system according to a second embodiment of the invention.
Figure 11:
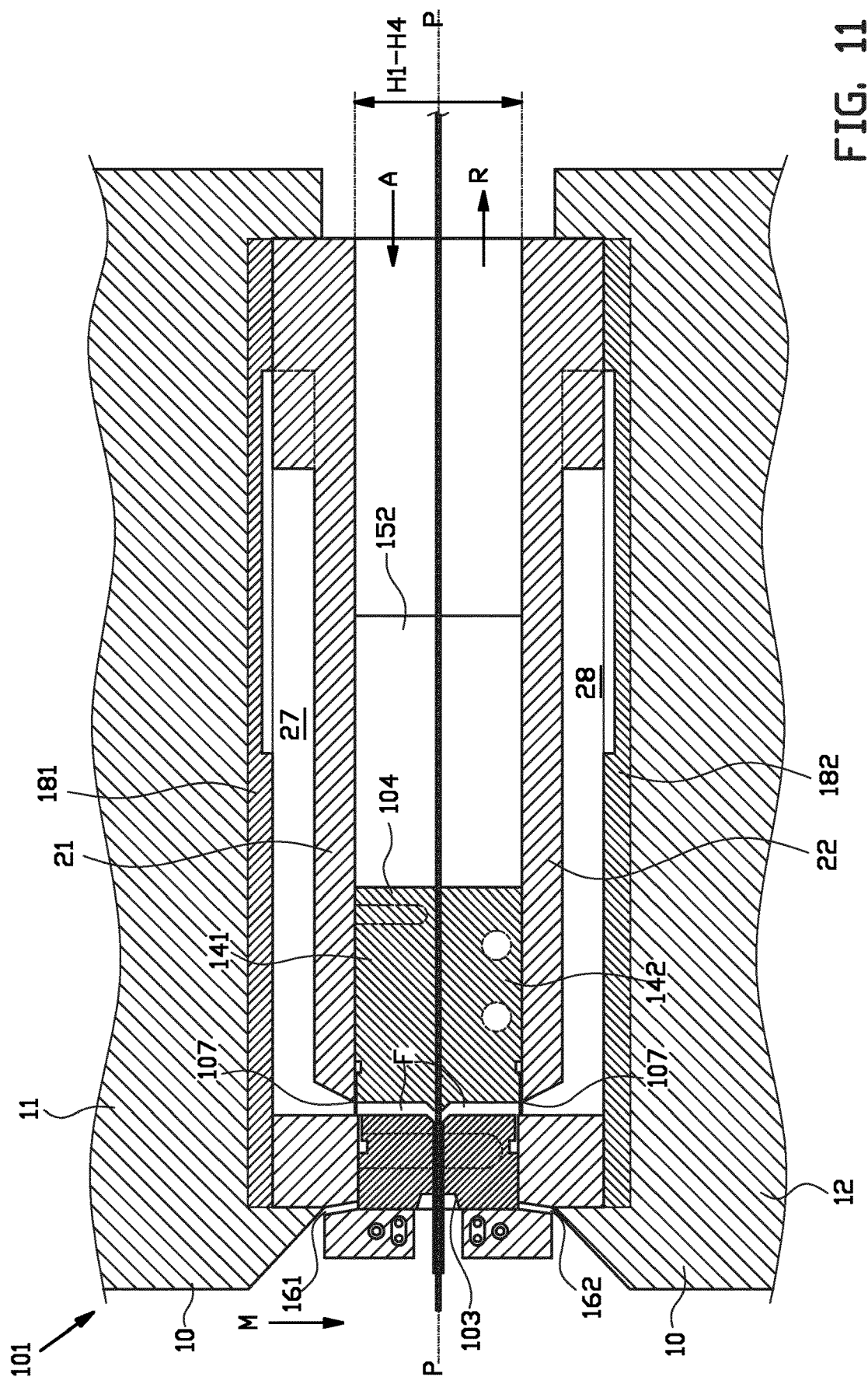

FIGS. 10 and 11 show an alternative extruder system 101 according to a second exemplary embodiment of the invention. The alternative extruder system 101 differs from the previously discussed extruder system 1 in that it features an alternative holder 105 for receiving an alternative die 103 in a mounting direction M perpendicular to the cord plane P. Optionally, the alternative extruder system 1 may further feature an alternative cord guide 104 that is separate from the alternative holder 105 and that is mountable to said alternative holder 105 in the same way as the alternative die 103, i.e. in the mounting direction M perpendicular to the cord plane P.

As best seen in FIG. 10, the alternative holder 105 comprises a first holding member 151 and a second holding member 152 which, at the intended positions of the alternative die 103 and the alternative cord guide 104, are provided with guiding elements in the form of slots 153, 154 extending in the mounting direction M perpendicular to the cord plane P. The alternative die 103 is provided with mounting elements 138 for engaging said slots 153, 154. Preferably, the alternative die 103 and the alternative cord guide 104 are assembled around the cords 91 prior to insertion and are inserted together and/or simultaneously in the mounting direction M The holding members 151, 152 are arranged to be connectable to either side of the alternative cord guide 104 in the transverse direction T perpendicular to the insertion direction A. Hence, the alternative cord guide 104 replaces the base 50 of the previously discussed embodiment. The alternative die 103 is held in place between the holding members 151, 152 and the fixed cord guide 104.

As shown in FIG. 10, the alternative cord guide 104 may be an integral piece, i.e. a Monobloc that is obtained from a single casting. In other words, the alternative cord guide 104 may have a first cord guide member 141 and a second cord guide member 142 that are integrally connected, i.e. indivisible, to each other. Alternative, a cord guide 204 similar to the one shown in FIGS. 1-9 may be used, having two separable cord guide members 241, 242 which are arranged to be mated to each other on opposite sides of the cord plane P. The cords 91 are placed in the channels (not shown) of the lower cord guide member 242 and guided through the die 103. When all cords 91 have been arranged, the upper cord guide member 241 is placed on top of the lower cord guide member 242. The cord guide 204 and die 103 are now insertable in the mounting direction M perpendicular to the cord plane P into the extruder head. The separable cord guide members 241, 242 have the advantage that the upper cord guide member 241 can be easily separated from the rest of the extruder system 101 to allow for replacement of one or more of the wires in the event of breakage It is further noted that in this second embodiment of the invention, the die height H1 and the cord guide height H2 are equal. Moreover, the first slot height H3 and the second slot height H4 are equal.

Moreover, as best seen in cross section in FIG. 11, the alternative die 103 does no longer feature a knife. Instead, the flow channels 27, 28 themselves are provided with a sharp angle that functions as an alternative knife 107 facing in the insertion direction A, to cut off the material remaining in the flow channels 27, 28 when the alternative die 103 is retracted. The alternative die 103 now acts as the counterpart that cooperates with the alternative knife 107 at the flow channels 27, 28.

FIG. 11 further shows that the first clamping member 21 and the second clamping member 22 are provided with a first drain channel 161 and a second drain channel 162, respectively, for draining superfluous extrusion material from the slots when the cord guide 104 and the die 103 are inserted. To keep said draining channels 161, 162 free from obstructions, the extruder head members 11, 12 may be provided with oblique or chamfered faces that open up the extruder head 10 with respect to said draining channels 161, 162.

Finally, it can be observed in FIGS. 10 and 11 that a first lid or a first cover 181 may be provided between the first extruder head member 11 and the first clamping member 21 to seal the first flow channel 27 with respect to the first extruder head member 11. Similarly, a second lid or a second cover 182 may be provided between the second extruder head member 12 and the second clamping member 22 to seal the second flow channel 28 with respect to the second extruder head member 12. Hence, the extruder head members 11, 12 are not in direct contact with the extrusion material and—as such—can be kept clean. These covers 181, 182 can also be used in any of the previously discussed embodiments.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. An extruder system for extruding cord reinforced extrudate, the extruder system comprising:
    an extruder head with one or more flow channels for receiving an extrusion material from an extruder,
    a die for receiving said extrusion material from the one or more flow channels, and
    a cord guide for guiding cords side-by-side in a cord plane into the die,
    wherein the extruder system further comprises a holder for holding the die with respect to the cord guide,
    wherein the extruder head is provided with an insertion slot that extends in an insertion direction through the extruder head, wherein the insertion direction extends parallel to the cord plane from an insertion opening of the extruder head to a flow area downstream of said insertion opening,
    wherein the one or more flow channels debouch into the insertion slot at said flow area,
    wherein the die and the cord guide are insertable in the insertion slot in the insertion direction from a position completely outside of the insertion slot through the insertion opening into a die position downstream of the flow area and a cord guide position upstream of the flow area, respectively, with respect to the insertion direction, and
    wherein the die is arranged to be connected to the cord guide by the holder prior to insertion such that the die and the cord guide are simultaneously insertable in the insertion direction into the insertion slot.

2. The extruder system according to claim 1, wherein the cord guide comprises a first cord guide member and a second cord guide member which are indivisible or formed as a Monobloc.

3. The extruder system according to claim 1, wherein the die is provided with a knife at the flow area that is arranged to cut-off extrusion material remaining in the flow area from the extrusion material in the one or more flow channels when the die and the cord guide are retracted from the insertion slot in a retraction direction opposite to the insertion direction,
wherein the knife is formed by two sharp edges at the end of the die facing in the retraction direction.

4. The extruder system according to claim 1, wherein the die and the cord guide have a die height and a cord guide height, respectively, in a direction normal to the cord plane, wherein the die height is smaller than the cord guide height.

5. The extruder system according to claim 1, wherein the insertion slot has a first slot height and a second slot height at the die position and the cord guide position, respectively, in a direction normal to the cord plane,
wherein the first slot height is smaller than the second slot height.

6. The extruder system according to claim 1, wherein the die and the cord guide have a die height and a cord guide height, respectively, in a direction normal to the cord plane, wherein the die height and the cord guide height are equal.

7. The extruder system according to claim 1, wherein the extruder system further comprises an actuator for aiding the insertion or removal of the die or the cord guide in the insertion direction and a retraction direction opposite to the insertion direction, respectively.

8. The extruder system according to claim 1, wherein a first cover is provided between the first extruder head member and the first clamping member and a second cover is provided between the second extruder head member and the second clamping member for sealing the first flow channel and the second flow channel, respectively, from the extruder head.

9. The extruder system according to claim 1, wherein the first clamping member and the second clamping member are provided with a first drain channel and a second drain channel, respectively, for draining superfluous extrusion material from the slots when the cord guide and the die are inserted.

10. The extruder system according to claim 1, wherein the one or more flow channels are provided with a sharp angle that functions as a knife facing in the insertion direction and wherein the die acts as a counterpart that cooperates with the knife at the flow channels to cut-off extrusion material remaining in the flow area from the extrusion material in the one or more flow channels when the die and the cord guide are retracted from the insertion slot in a retraction direction opposite to the insertion direction.

11. The extruder system according to claim 1, wherein the extruder head is provided with an interior surface that defines the insertion slot,
wherein the die is provided with a first slide surface and a second slide surface extending parallel to and on opposite sides of the cord plane and wherein the cord guide is provided with a third slide surface and a fourth slide surface extending parallel to and on opposite sides of the cord plane for sliding the die and the cord guide along said interior surface in the insertion direction.

12. The extruder system according to claim 11, wherein the extruder system is further provided with a first sealing element between the first sliding surface and the interior surface and a second sealing element between the second sliding surface and the interior surface for sealing the flow area from the interior surface downstream of the first sealing element and the second sealing element with respect to the insertion direction.

13. The extruder system according to claim 12, wherein the die extends in the insertion direction along the interior surface over a die length,
wherein the first sealing element and the second sealing element are located at less than half the die length from the flow area when the die is in the die position.

14. The extruder system according to claim 12, wherein the first sealing element and the second sealing element are sealing gutters that are formed in the first sliding surface and the second sliding surface, respectively,
wherein the sealing gutters are open towards the interior surface,
wherein the sealing gutters are in fluid communication with the flow area to receive leaked extrusion material.

15. The extruder system according to claim 11, wherein the die is provided with a die outlet opening that forms the extrusion material into the extrudate and an accumulation recess that is located between the first slide surface and the die outlet opening spaced apart from said die outlet opening and is open towards said first slide surface and the insertion direction for accumulating extrusion material that is scraped off from the interior surface by insertion of the die in the insertion direction.

16. The extruder system according to claim 11, wherein the extruder system is further provided with a third sealing element between the third sliding surface and the interior surface and a fourth sealing element between the fourth sliding surface and the interior surface for sealing the flow area from the interior surface upstream of the third sealing element and the fourth sealing element with respect to the insertion direction.

17. The extruder system according to claim 16, wherein the cord guide extends in the insertion direction along the interior surface over a cord guide length,
wherein the third sealing element and the fourth sealing element are located at less than half the cord guide length from the flow area when the cord guide is in the cord guide position.

18. The extruder system according to claim 16, wherein the third sealing element and the fourth sealing element are sealing gutters that are formed in the third sliding surface and the fourth sliding surface, respectively,
wherein the sealing gutters are open towards the interior surface,
wherein the sealing gutters are in fluid communication with the flow area to receive leaked extrusion material.

19. The extruder system according to claim 1, wherein the holder is directly connected to or integral with the cord guide.

20. The extruder system according to claim 19, wherein the holder comprises a base at the cord guide,
wherein the holder extends from the base towards the die to hold the die with respect to said base.

21. The extruder system according to claim 20, wherein the holder comprises a first holding member and a second holding member that are arranged to extend from the base towards and alongside the die in the insertion direction at a first side and a second side, respectively, of the die in a transverse direction perpendicular to the insertion direction.

22. The extruder system according to claim 21, wherein the first holding member and the second holding member are provided with one or more mating surfaces which are arranged to abut the die in the insertion direction and which are spaced apart from the cord guide in the insertion direction to form the flow area between the die and the cord guide.

23. The extruder system according to claim 21, wherein the die is mountable to the holder in a mounting direction opposite to the insertion direction.

24. The extruder system according to claim 23, wherein the first holding member and the second holding member are provided with a first guiding element and a second guiding element, respectively, extending in a direction parallel to the mounting direction,
wherein the die is provided with a first mounting element and a second mounting element which are arranged to slidably engage the first guiding element and the second guiding element, respectively, in the mounting direction.

25. The extruder system according to claim 24, wherein the cord guide comprises a first cord guide member and a second cord guide member which are arranged to be mated to each other on opposite sides of the cord plane,
wherein one of the first cord guide member and the second cord guide member is directly connected to or integral with the holder,
wherein the other of the first cord guide member and the second cord guide member is provided with a third mounting element and a fourth mounting element which are arranged to slidably engage the first guiding element and the second guiding element, respectively, in the mounting direction.

26. The extruder system according to claim 25, wherein the other of the first cord guide member and the second cord guide member is arranged to be mounted between the holder and the die in the mounting direction.

27. The extruder system according to claim 25, wherein the cord guide is provided with a cord guide nose that together with the die defines the flow area,
wherein the first cord guide member and the second cord guide member are provided with first mating surfaces and second mating surfaces, respectively, which are arranged to abut the die in the insertion direction and which are spaced apart from the cord guide nose in the insertion direction to form the flow area between the die and the cord guide.

28. The extruder system according to claim 1, wherein the holder comprises a first holding member and a second holding member that are connectable to the sides of the cord guide in a transverse direction perpendicular to the insertion direction,
wherein the first holding member and the second holding member, when connected to the cord guide, extend from the cord guide towards and alongside the die in the insertion direction at a first side and a second side, respectively, of the die in the transverse direction.

29. The extruder system according to claim 28, wherein the die or the cord guide are mountable to the holder in a mounting direction perpendicular to the cord plane.

30. The extruder system according to claim 29, wherein the first holding member and the second holding member are provided with a first guiding element and a second guiding element, respectively, extending in a direction parallel to the mounting direction,
wherein the die is provided with a first mounting element and a second mounting element which are arranged to slidably engage the first guiding element and the second guiding element, respectively, in the mounting direction.

31. The extruder system according to claim 1, wherein the cord guide comprises a first cord guide member and a second cord guide member which are arranged to be mated to each other on opposite sides of the cord plane.

32. The extruder system according to claim 31, wherein the first cord guide member is independently mountable to and dismountable from the second cord guide member.

33. The extruder system according to claim 1, wherein the extruder system further comprises a first coupling element for coupling the die to the cord guide,
wherein the first coupling element allows for movement of the die with respect to the cord guide in the insertion direction into the die position when the extrusion material exerts pressure on said die in the insertion direction.

34. The extruder system according to claim 33, wherein the extruder head provides an abutment surface for abutting the die in a direction opposite to the insertion direction when the die is in the die position.

35. The extruder system according to claim 1, wherein the insertion slot has a first slot height and a second slot height at the die position and the cord guide position, respectively, in a direction normal to the cord plane,
wherein the first slot height and the second slot height are equal.

36. The extruder system according to claim 1, wherein the one or more flow channels comprise a first flow channel that debouches into the flow area from a first side of the cord plane and a second flow channel that debouches into the flow area from a second side of the cord plane opposite to the first side.

37. The extruder system according to claim 36, wherein the die and the cord guide are provided with a die inlet opening and a cord guide nose, respectively, that together form the flow area which is aligned with or connects to the first flow channel at the first side of the cord plane and the second flow channel at the second side of the cord plane when the die and the cord guide are in the die position and the cord guide position, respectively.

38. A method for extruding cord reinforced extrudate, the method comprising:
providing an extruder system for extruding the cord reinforced extrudate, the extruder system including
an extruder head with one or more flow channels for receiving an extrusion material from an extruder,
a die for receiving said extrusion material from the one or more flow channels, and
a cord guide for guiding cords side-by-side in a cord plane into the die,
wherein the extruder system further comprises a holder for holding the die with respect to the cord guide,
wherein the extruder head is provided with an insertion slot that extends in an insertion direction through the extruder head, wherein the insertion direction extends parallel to the cord plane from an insertion opening of the extruder head to a flow area downstream of said insertion opening,
wherein the one or more flow channels debouch into the insertion slot at said flow area,
wherein the die and the cord guide are insertable in the insertion slot in the insertion direction from a position completely outside of the insertion slot through the insertion opening into a die position downstream of the flow area and a cord guide position upstream of the flow area, respectively, with respect to the insertion direction, and wherein the die is arranged to be connected to the cord guide by the holder prior to insertion such that the die and the cord guide are simultaneously insertable in the insertion direction into the insertion slot;

wherein the method further comprises the steps of connecting the die and the cord guide and inserting the die and the cord guide simultaneously from the position completely outside of the insertion slot in the insertion direction in the insertion slot into the die position and the cord guide position, respectively.

39. The method according to claim 38, wherein the extruder head is provided with an interior surface that defines the insertion slot, wherein the method comprises the step of sealing the die and the cord guide with respect to the interior surface by allowing an amount of extrusion material to cure between the die and the interior surface and between the cord guide and the interior surface.

40. The method according to claim 38, wherein the die or the one or more flow channels are provided with a knife at the flow area, wherein the method comprises the step of using the knife to cut-off extrusion material remaining in the flow area from the extrusion material in the one or more flow channels when the die and the cord guide are retracted from the insertion slot in a retraction direction opposite to the insertion direction.

* * * * *